(12) United States Patent
Prinzel, III et al.

(10) Patent No.: US 8,164,485 B2
(45) Date of Patent: Apr. 24, 2012

(54) SYSTEM AND METHOD FOR AIDING PILOT PREVIEW, REHEARSAL, REVIEW, AND REAL-TIME VISUAL ACQUISITION OF FLIGHT MISSION PROGRESS

(75) Inventors: Lawrence J. Prinzel, III, Newport News, VA (US); Alan T. Pope, Poquoson, VA (US); Steven P. Williams, Yorktown, VA (US); Randall E. Bailey, Williamsburg, VA (US); Jarvis J. Arthur, Williamsburg, VA (US); Lynda J. Kramer, Yorktown, VA (US); Paul C. Schutte, Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 635 days.

(21) Appl. No.: 11/863,964

(22) Filed: Sep. 28, 2007

(65) Prior Publication Data
US 2008/0195309 A1    Aug. 14, 2008

Related U.S. Application Data

(63) Continuation-in-part of application No. 11/696,333, filed on Apr. 4, 2007, now Pat. No. 7,737,867.

(60) Provisional application No. 60/797,080, filed on Apr. 13, 2006, provisional application No. 60/912,023, filed on Apr. 16, 2007.

(51) Int. Cl.
*G08B 21/00* (2006.01)
(52) U.S. Cl. .................. 340/945; 340/961; 340/983
(58) Field of Classification Search .................. 340/945, 340/946, 947, 948, 949, 951, 959, 961–964, 340/967, 971, 972–983
See application file for complete search history.

(56) References Cited

U.S. PATENT DOCUMENTS

| | | | |
|---|---|---|---|
| 5,593,114 A | 1/1997 | Ruhl | |
| 5,657,009 A * | 8/1997 | Gordon | 340/968 |
| 6,061,068 A | 5/2000 | Hoffman, II et al. | |
| 6,199,008 B1 * | 3/2001 | Aratow et al. | 701/120 |
| 6,496,189 B1 | 12/2002 | Yaron et al. | |
| 6,690,299 B1 | 2/2004 | Suiter | |
| 6,700,482 B2 * | 3/2004 | Ververs et al. | 340/500 |
| 6,747,649 B1 | 6/2004 | Sanz-Pastor et al. | |
| 6,774,649 B2 * | 8/2004 | Hartmann | 324/754 |
| 6,816,780 B2 * | 11/2004 | Naimer et al. | 701/206 |
| 6,879,896 B2 | 4/2005 | Martens | |
| 6,931,368 B1 | 8/2005 | Seifert | |

(Continued)

*Primary Examiner* — Daniel Previl
(74) *Attorney, Agent, or Firm* — Andrea Z. Warmbier; Helen M. Galus

(57) ABSTRACT

Embodiments of the invention permit flight paths (current and planned) to be viewed from various orientations to provide improved path and terrain awareness via graphical two-dimensional or three-dimensional perspective display formats. By coupling the flight path information with a terrain database, uncompromising terrain awareness relative to the path and ownship is provided. In addition, missed approaches, path deviations, and any navigational path can be reviewed and rehearsed before performing the actual task. By rehearsing a particular mission, check list items can be reviewed, terrain awareness can be highlighted, and missed approach procedures can be discussed by the flight crew. Further, the use of Controller Pilot Datalink Communications enables data-linked path, flight plan changes, and Air Traffic Control requests to be integrated into the flight display of the present invention.

30 Claims, 3 Drawing Sheets

U.S. PATENT DOCUMENTS

| | | |
|---|---|---|
| 7,010,398 B2 | 3/2006 | Wilkins, Jr. et al. |
| 7,123,260 B2 | 10/2006 | Brust |
| 7,212,216 B2 | 5/2007 | He et al. |
| 7,216,069 B2 * | 5/2007 | Hett ................................ 703/6 |
| 7,312,725 B2 * | 12/2007 | Berson et al. ................ 340/980 |
| 7,385,527 B1 * | 6/2008 | Clavier et al. ................ 340/945 |
| 2003/0193411 A1 * | 10/2003 | Price ............................ 340/973 |
| 2005/0232512 A1 | 10/2005 | Luk et al. |
| 2006/0066459 A1 | 3/2006 | Burch et al. |
| 2007/0020588 A1 | 1/2007 | Batcheller et al. |

* cited by examiner

SYSTEM AND METHOD FOR AIDING PILOT PREVIEW, REHEARSAL, REVIEW, AND REAL-TIME VISUAL ACQUISITION OF FLIGHT MISSION PROGRESS

CROSS-REFERENCE TO RELATED APPLICATIONS

This application is a continuation-in-part of U.S. application Ser. No. 11/696,333, filed Apr. 4, 2007now U.S. Pat. No. 7,737,867, which in turn claims priority to U.S. Provisional Application No. 60/797,080, filed Apr. 13, 2006, the contents of which are incorporated herein in their entirety. This application claims priority to U.S. Provisional Application No. 60/912,023, filed Apr. 16, 2007.

FIELD OF THE INVENTION

The present invention generally relates to aircraft navigation and safety systems and, more particularly, relates to systems and methods for displaying navigational information to assist in aircraft operations.

BACKGROUND OF THE INVENTION

The problems confronting modern aviation still involve limited visibility as a causal factor. For example, 30% of commercial aviation and 50% of all aviation fatalities are categorized as controlled-flight-into-terrain (CFIT) accidents. In general aviation (GA), almost three times more GA fatalities occurred in instrument meteorological (i.e., limited visibility) conditions. Limited visibility also increases the potential for runway incursions. From 2000 to 2003, 5.6 runway incursions occurred on average per million aircraft operations or 1,474 runway incursions out of 262 million aircraft operations. Probably the most significant problem causing airport delays are limited runway capacity and the increased air traffic separation required when weather conditions fall below visual flight rules operations. Many of these visibility problems have much to do with how cognitively complex flying has become owing, largely to the evolution of cockpit displays design, which require the pilot to extract and integrate information from multiple display sources to form a mental model. As a consequence, significant increases in aviation safety are unlikely to come from continued extrapolation from what exists today.

Previous flight management display methods transform and display flight management information obtained from flight data sensors and programmed plan information to display a graph or chart of a measured variable of the underlying flight mission. The existing flight management displays depict only ownship information with minimal symbology depictions (typically limited to airport symbology, navigational aids, etc.). Pilots currently have to mentally rehearse, memorize, and then translate the mental model to a plan view of two-dimensional navigation display information. Such two-dimensional navigation display information presents no correlating symbology to FAA approved and airline company charts that specifically define what the flight crew must do for particular standard operational procedures and non-normal procedures.

During flight operations, it is also critical that the pilot(s) listen and/or watch for updates, modifications, revisions, or other changes to air traffic control (ATC) clearance. The ATC clearance may be received via voice communications, or may be received via a datalink such as the Controller Pilot Datalink Communications (CPDLC) system. For example, the pilot may be on a specified approach into an airport (the aircraft's current intended route—direction, altitude, etc.—may be termed the "current flight path" or the "actual flight path"). While on approach, the pilot may receive an ATC clearance to change to a different approach, due to, e.g., wind shift requiring use of a different runway (the aircraft's suggested new route—direction, altitude, etc,—may be termed the "planned flight path" or the "predicted flight path"). Due to ATC error, the planned flight path could put the aircraft on a path that would result in the aircraft flying into terrain (i.e., CFIT). It may be difficult for the pilot to immediately recognize the potential danger, especially in limited visibility situations, and the pilot may accept the potentially disastrous ATC clearance (the pilot accepts the ATC clearance by issuing a WILCO response, indicating that the pilot will comply). In such a limited visibility situation, the pilot may not recognize the error until alerted by the Terrain Awareness and Warning System (TAWS). By the time the TAWS provides an alert, it may be necessary for the pilot to execute an aggressive vertical "pull-up" maneuver to avoid the terrain, and in some situations it may be too late to avoid the terrain.

BRIEF SUMMARY OF THE INVENTION

The object of the present invention is to overcome the aforementioned drawbacks of current aircraft navigational and safety systems and to provide information to the flight crew in a single, integrated 3D exocentric multifunction display that depicts the terrain and planned flight paths in an intuitive manner to the pilot and minimizes the needs of flight crews to have to mentally translate paper charts, map them to the real world, and then maintain mental models based on the information-sparse navigation display currently available onboard commercial aircraft today. The pilot can use the integrated 3D display to instantaneously confirm, predict, update, and correlate flight critical information with other system management information displays (e.g. the primary flight display (PFD), navigational displays, the flight management system (FMS), etc.). Furthermore, the pilot can use the display to conduct 'what if' scenarios or rehearse a planned route to determine whether, for example, to accept ATC clearances, adjust flight control settings, etc.

In one embodiment of the invention, a system for displaying flight mission progress of an aircraft comprises a processing element and a display element. The processing element is configured to render an exocentric flight display of the aircraft, the flight display comprising at least an external scene topography, a current flight path, a planned flight path, one or more obstacles within a predefined distance of either the current or planned flight path, and one or more navigational symbologies. The display element is configured to receive and display the flight display. The processing element may be further configured to render a side-view terrain image showing either a current flight path or a planned flight path and terrain height at corresponding points along the respective current or planned flight path.

The processing element may be further configured to receive current location and attitude information of the aircraft and to render the current location and attitude on the flight display. In such a case, the external scene topography corresponds to the current aircraft location. The processing element may be further configured to render the current location, a past location, or a future location of the aircraft on the flight display.

The processing element may be further configured to receive current location information of other aircraft within a predefined distance the aircraft and to render the other aircraft within the flight display. The processing element may be further configured to receive and respond to air traffic control (ATC) clearance information and wherein the rendered planned flight path corresponds to the ATC clearance information.

The processing element may be further configured to determine if the current flight path or the planned flight path is predicted to cause the aircraft to approach within (a) a first predefined distance from terrain or (2) a second predefined distance from an obstacle, and to render an alternate flight path selected to avoid causing such an approach.

The external scene topography may correspond to a future location along either the current or planned flight path. The processing element may be further configured to advance in time the rendered external scene topography along either the current or planned flight path, and at a selected speed. The processing element may be further configured to determine whether the current aircraft location is greater than a predefined distance from the current flight path.

In addition to the system for displaying flight mission progress as described above, other aspects of the present invention are directed to corresponding methods for displaying flight mission progress.

BRIEF DESCRIPTION OF THE DRAWINGS

Figure 1:
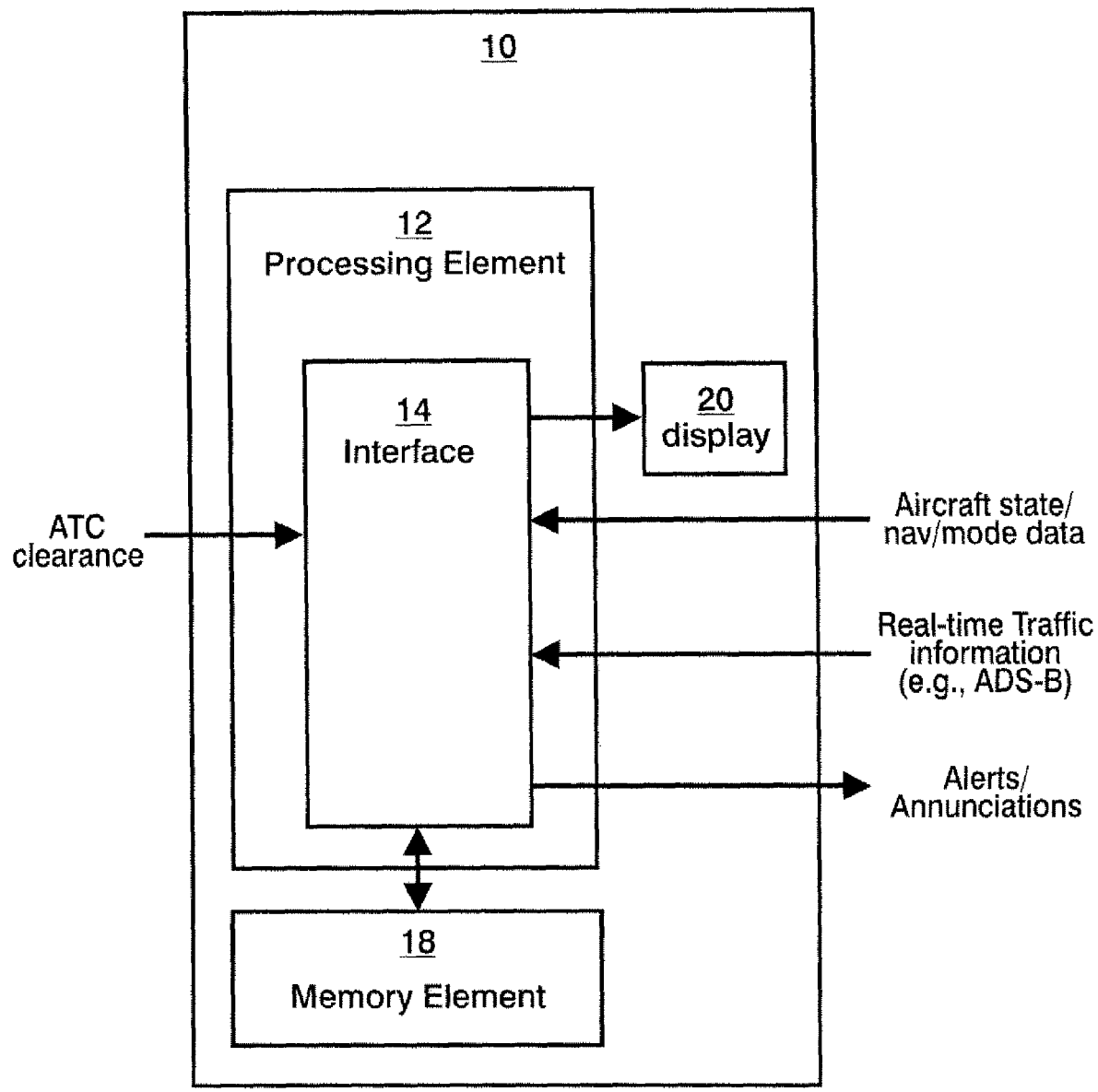
Figure 2:
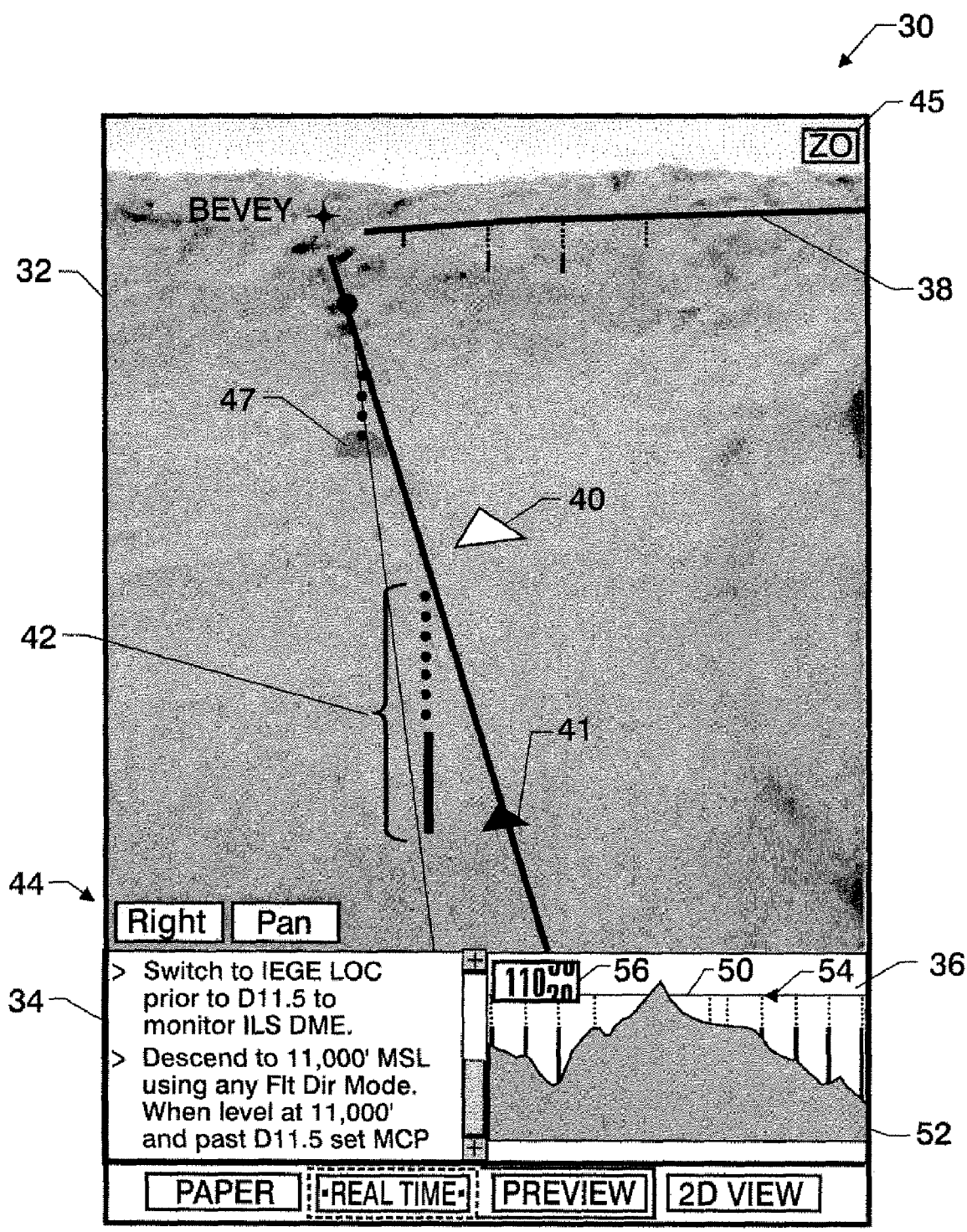
Figure 3:
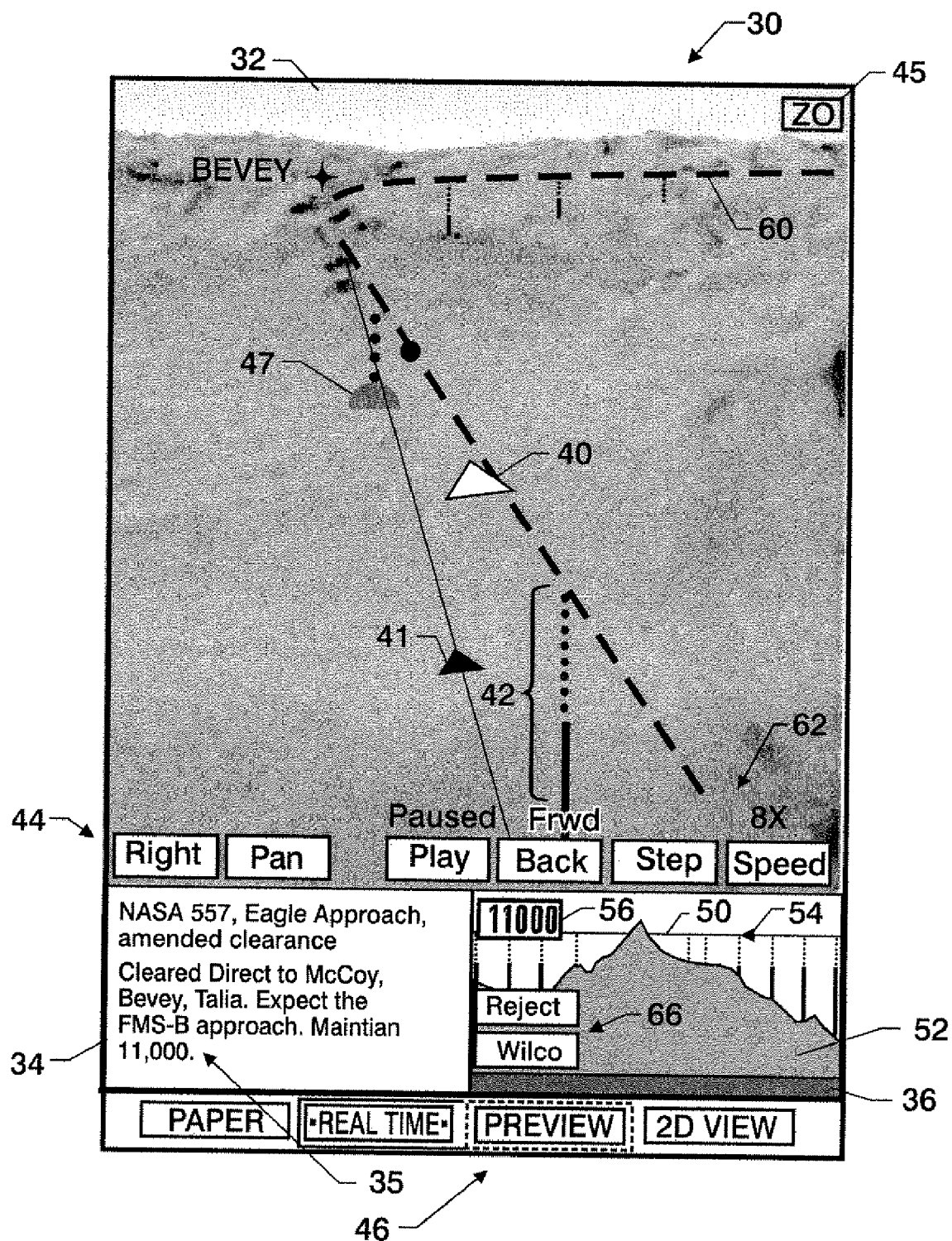

Having thus described the invention in general terms, reference will now be made to the accompanying drawings, which are not necessarily drawn to scale, and wherein:

FIG. 1 is a schematic block diagram of a system or displaying flight mission progress of an aircraft, in accordance with one embodiment of the invention; and FIG. 2-3 illustrate display modes of a system for displaying flight mission progress of an aircraft, in accordance with embodiments of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention attempt to mitigate the most significant issues confronting commercial aviation safety due to restricted visibility, which include controlled flight into terrain accidents and loss of situation awareness. The invention provides a 3D exocentric flight display that enables pilots to preview, rehearse, review, and understand real-time visual acquisition of flight mission progress. This display may comprise terrain; current and predicted flight paths; air space restrictions and classifications; obstacles; cultural features; sectional, approach, enroute, and other chart symbologies; company and Federal Aviation Administration (FAA) nominal (i.e., normal or standard) procedures, such as Approach (Procedure) with Vertical Guidance (APV), Required Navigational Performance (RNP), Instrument Landing System (ILS), missed approaches, etc; enroute routes; special procedures and off-nominals (i.e., non-standard or emergency procedures); weather; traffic; and other pertinent flight environmental features and operational needs and considerations. The invention allows the pilot to rehearse and preview flight plans that have been loaded into the FMS, anticipated changes to aircraft routes, rehearse new and unfamiliar procedures, etc. The innovation further provides the pilot with a real-time depiction of where the aircraft is in relation to significant terrain, planned flight paths, airspace restrictions and classifications, and provides departure, enroute, approach, and arrival status through 4D depiction of FAA chart symbology overlaid with ownship status information (e.g., aircraft ownship symbol, 4D Required Navigation Performance status, Time to Arrivals, etc.).

For purposes of this application, "terrain" refers to the natural features of the earth (e.g. mountains, hills, etc.). "obstacle" refers to manmade objects in an airspace (e.g., water tower, cell tower, etc.), and "cultural feature" refers to surface features (e.g., river, lake, road, etc.). The flight management system (EMS) is a computerized avionics component that assists pilots in navigation, flight planning, and aircraft control functions. The FMS provides real-time lateral navigation information by showing the route programmed by the pilots, as well as other pertinent information from the flight database, such as standard departure and arrival procedures.

The invention transforms and displays flight management information obtained from flight data sensors and programmed flight plan information in such a way as to accurately represent the functioning of the underlying flight mission in both action and appearance. The display of the flight management information is intended to be what would be seen in real-time, fast-time, slow-time or stop-action from the vantage point of an observer positioned near the flight path and capable of dynamically changing the viewing perspective. The result is an exocentric display environment for preview, rehearsal and/or review of flight progress. An additional result is an exocentric display environment for the real-time depiction of flight mission progress.

Such an exocentric display that could allow pilots to rehearse and preview flight path information and ATC clearances in relation to 3-D terrain information may significantly enhance the potential to proactively, in contrast to reactively (i.e., responding to TAWS alerts), prevent flight crews from getting into potential CFIT situations. The preview capability would enable flight crews to develop and refine their mental model well before any possibility of CFITs could present themselves.

Embodiments of the invention permit flight paths (current and planned) to be viewed from various orientations to provide improved path and terrain awareness via graphical 2-dimensional (2-D) or 3-D) perspective display formats. By coupling the flight path information with a terrain database, uncompromising terrain awareness relative to the path and ownship is provided. In addition, missed approaches, path deviations, and any navigational path can be reviewed and rehearsed before performing the actual task. By rehearsing a particular mission, checklist items can be reviewed terrain awareness and airspace restrictions can be highlighted, and missed approach procedures can be discussed by the flight crew. Further, the use of Controller Pilot Datalink Communications (CPDLC) (a system in which air traffic controllers can communicate with pilots over a datalink) enables datalinked path, flight plan changes, and Air Traffic Control requests to be integrated into the flight display of the present invention.

The present invention provides a 3D multifunctional hybrid photorealistic/false colored rendering of the outside world translated into three-dimension (complete with high resolution 3-arc second rendering of terrain, cultural features, obstacles, airports, etc.). A hybrid photorealistic/false colored rendering of the terrain applies false coloring to some of the displayed photorealistic features to enhance desired aspects of the feature (e.g., to enhance awareness of the height of the surrounding terrain). The display may be overlaid with 3D renderings of FAA and airline company chart (e.g., approach, Standard Terminal Arrival Route (STARS), Standard Instrument Departure (SIDS), special operations, etc.) symbologies that are true scaled to the display to provide a one-to-one mapped scaling of ownship position to these symbologies, terrain, obstacles, etc. The present invention may further provide four-dimensional (4D) (i.e., time correlated) time-to-arrival and Distributed Air/Ground Traffic Management (DAG-TM) capabilities. The present invention may provide 3D airspace classification depictions and denote temporary and permanent airspace restrictions.

The invention may be coupled with a synthetic vision system primary flight display (PFD), a head-up display, a head-mounted display, a navigation display, and a moving map surface operations display, thereby allowing the pilot to go beyond the limited range of visualization provided by the existing art to enable the flight crew to see the entire flight as loaded into the Flight Management System, to see how changes may effect the flight at any time, to determine whether the aircraft will meet airspace constraints, to see flight path trajectories from numerous pilot-controlled viewing perspectives, to see hazards (weather, terrain, other aircraft, etc.) as they exist in one-to-one scaling with pertinent airspace system elements (e.g., ownship, flight path, airport, waypoints, VORs (VHF Omni-directional Radio Range) and other navigational aids, ILS and approach aids, air service provider corridors, restricted airspaces, etc.). The display may also depict dispatch information, FANS (Future Air Navigation System), ATC (Air Traffic Control) and other datalinked messages, NOTAMS (Notice to Airmen), instructions, etc. The pilot can initiate a mode to instantly determine the effect of accepting and executing (WILCO) the datalinked instructions. Thus the invention enables the pilots to hypothesis test, decision scenario generate, preview and rehearse, and engage flight scenarios to determine efficacy before executing or, in fact, leaving the ground. As such, the present invention is a flight crew tool that will significantly enhance aircraft safety and capacity capabilities and enable future commercial operations, in conjunction with already developed synthetic vision system technology, to help meet future airspace system (also referred to as the Next Generation Air Transportation System, NextGen) needs.

The present invention interfaces with and is coupled to the aircraft flight management system to provide a visualization display for aiding pilot preview, rehearsal and/or review and real-time display of flight mission progress particularly in relation to flight critical airspace elements. The exocentric display of the present invention may be presented on a multifunction cockpit display, an electronic flight bag display, a hand-held tablet PC or other non-FAA certified display, a heads-up display, an advanced wearable display device (e.g., head-worn eyeglasses, helmets, etc.), or any other suitable display device. The present invention interfaces with existing synthetic terrain databases, FMS databases and software, surveillance, communication, and navigation technologies, and other existing flight critical aircraft systems. The present invention determines ownship position (typically through its interface with existing aircraft navigational equipment), relates the position to a database of graphically drawn elements corresponding to airspace pertinent elements (e.g., VORs, airports, airspaces and perimeter zones), and renders an intuitive display of the outside world corresponding to the aircraft position. The pilot can manipulate (through voice recognition commands, pilot input, etc.) the particular view to change the perspective of the display. The hybrid photorealistic/false colored terrain view is overlaid by the pertinent chart and airspace elements and symbologies.

By knowing the exact positioning of the aircraft, the present invention can render the ownship in its current position relative to the flight path (either actual or planned). Based on pilot input, the invention can advance the ownship aircraft symbol along the depicted 4D flight path. The invention may advance the display at a predefined or pilot-selectable speed (e.g., based on a multiplier of anticipated actual aircraft speed) (i.e., fast forward). The invention may advance the display all the way through to the end, rewind the display, or pause the display. The invention may pan the view side-to-side or flip the perspective (i.e., back toward the aircraft).

The present invention can interface with the aircraft's electronic flight instrument system (EFIS) to interrogate datalink messages, FMS loads and changes (prior to execution of the changes), and many other interactions with the aircraft flight management system. The invention not only provides a rehearsal and preview capability but is also capable of continuously refreshing and showing current position, estimated time to arrival, and other flight critical information currently shown on the PFD and NAV flight displays. The display of the present invention can present information in an innovative and unique way since the display may not be limited, as the PFD and NAV displays are, to stringent FAA certification rules since the display of the present invention is primarily intended for FAA-defined "situation awareness use only."

Referring now to FIG. 1, a schematic block diagram of a system 10 for displaying flight mission progress of an aircraft is illustrated, in accordance with one embodiment of the invention. The system 10 comprises a processing element 12, a memory element 18, and a display 20. The processing element 12 is further comprised of an interface element 14. The processing element 12 receives current location information of the aircraft. The location information may be received via the interface element 14 from an aircraft navigation system, such as from a global positioning system (GPS) or an inertial navigation system (INS). Based on the current aircraft location, the processing element 12 renders an exocentric flight display of the aircraft. The display element receives the flight display from the processing element and displays the flight display.

The exocentric flight display may comprise at least an external scene topography, a current flight path, a planned flight path, one or more obstacles within a predefined distance of either the current or planned flight path, and one or more navigational symbologies. The processing element renders the exocentric flight display using highly detailed terrain maps stored in memory element 18. The external scene topography may correspond to the current aircraft location, and the processing element may be configured to render the current location on the flight display. Alternatively, the processing element may be configured to render a past location or a future location of the aircraft on the flight display. As such, the rendered external scene topography may correspond to such a past or future aircraft location.

The processing element may be configured to receive current location information of other aircraft within a predefined distance from the aircraft and to render the other aircraft within the flight display. The location of other aircraft may be determined using an Automatic Dependent Surveillance-Broadcast (ADS-B) system. ADS-B is an air traffic surveillance technology in which all aircraft automatically and repeatedly broadcast digital data packets containing the aircraft's unique airframe identification, flight identification (call sign), current latitude and longitude, current altitude, and current three-dimensional velocity (i.e., rate of climb/descent, direction, and speed). The ADS-B information may be received from all nearby aircraft by the interface 14. The processing element 12 is able to determine the location of each aircraft, thereby enabling the processing element to render any aircraft that would be within the field of view. The unique airframe identification enables the processing element to determine the type of aircraft (e.g., Boeing 777) in order to render the nearby aircraft on the display and to annunciate to the flight crew the aircraft type to aid visual identification. Virtual models of a large number of different aircraft types may be stored in memory element 18 to enable the processing element to accurately render each different aircraft type.

The processing element may be configured to receive and respond to air traffic control (ATC) clearance information. The ATC clearance information may be received, via the interface 14, over a datalink such as the Controller Pilot Datalink Communications (CPDLC) system. The ATC clearance may comprise a new flight path recommendation for the pilot to follow. While the air traffic controller may desire the pilot to follow the new flight path, the pilot must independently assess the appropriateness of the new flight path and determine whether or not to comply with the request. If the pilot agrees to comply with the request, the pilot will issue a "WILCO" reply. To assist the pilot in determining whether or not to follow the new flight path, embodiments of the present invention enable the pilot to preview the new flight path.

The present invention renders the new flight path (termed the "planned flight path") according to the ATC clearance in the exocentric display, along with the terrain, obstacles, etc., that are within the field of view along the planned flight path. Thus, the pilot can readily see the relationship between the planned flight path and the terrain, obstacles, etc., and readily determine if following the planned flight path would cause the aircraft to approach too close to the terrain, obstacles, etc. The aircraft location in relationship to the planned flight path would be shown by an ownship indicator.

The preview of the planned flight path would typically begin by displaying, upon input by the pilot, the planned flight path from the perspective of the current aircraft location. The terrain, obstacles, etc. would also correspond to the perspective of the current aircraft location. The preview would then advance in time the ownship indicator along the planned flight path, and would similarly advance in time the display of the terrain, obstacles, etc., to conform to the advanced (i.e., future) aircraft location along the planned flight path. By advancing in time the display, the present invention enables the pilot to preview the entire planned flight path. The display may be advanced in time at any one of several predefined speeds (e.g. two times normal speed, four times normal speed, etc.) ("fast forward"), which may be pilot selectable. The advance of the display may also be paused and reversed ("rewound").

While preview of the planned flight path is described above, it should be appreciated that the current flight path may also be viewed and previewed. Whether the current or planned flight path is displayed is typically based on pilot selection. The present invention renders the current flight path according to the flight path information in the FMS, along with the terrain, obstacles, etc., that are within the field of view along the current flight path. Thus, even in low visibility situations, the pilot can readily see the relationship between the current flight path and the terrain, obstacles, etc., and readily determine if following the current flight path would cause the aircraft to approach too close to the terrain, obstacles, etc. The aircraft location in relationship to the current flight path would be shown by an ownship indicator.

The default view of the current flight path would typically comprise display of the current flight path from the perspective of the current aircraft location. The terrain, obstacles, etc. would also correspond to the perspective of the current aircraft location. The pilot may select to preview the current flight path, which would cause the rendered display to advance in time the ownship indicator along the current flight path, and would similarly advance in time the display of the terrain obstacles, etc., to conform to the advanced (i.e., future) aircraft location along the current flight path. By advancing in time the display, the present invention enables the pilot to preview the entire current flight path. As with the preview of the planned flight path, the display may be advanced in time at any one of several predefined speeds (e.g., two times normal speed, four times normal speed, etc.) ("fast forward"), which may be pilot selectable. The advance of the display may also be paused and reversed ("rewound"). Further, the pilot can step through the flight plan to view the upcoming chart instructions which are integrated in the display.

While the display of the current or planned flight path relative to terrain, obstacles, etc. enables a pilot to readily see if either the current or planned flight path will cause the aircraft to approach too close to terrain, obstacles, etc., the processing element may also make this determination. Thus, the processing element may be configured to determine if the current flight path or the planned flight path is predicted to cause the aircraft to approach within (a) a first predefined distance from terrain or (2) a second predefined distance from an obstacle, the first or second predefined distances may be expressed in terms of vertical distance, horizontal distance, vertical and horizontal distance, or straight-line distance. For example, the processing element may be configured to determine if the current or planned flight path will cause the aircraft to come within 1000 vertical feet above ground. Or the processing element may be configured to determine if the current or planned flight path will cause the aircraft to come within ¼ mile horizontal distance and 500 feet vertical distance from a communication antenna.

If the processing element determines that either the current or planned flight path will cause the aircraft to approach too close to terrain, obstacles, etc., the processing element may produce an alert (visual, audible, or both) for the pilot. The processing element may also be configured to render an alternate flight path that is selected to avoid causing the aircraft to approach within (a) the first predefined distance from terrain or (2) the second predefined distance from an obstacle.

The processing element may also be configured to monitor how much the aircraft has deviated from the current flight path, and to alert the pilot if the current aircraft location is greater than a predefined distance from the current flight path.

The processing element may be further configured to render a side-view terrain image showing either a current flight path or a planned flight path and terrain height at corresponding points along the respective current or planned flight path. This view, as described further in conjunction with FIG. 2, enables the pilot to readily see the expected height of the aircraft above the terrain at all points along the current or planned flight path.

Referring now to FIG. 2, a display mode of a system for displaying flight mission progress of an aircraft is illustrated, in accordance with embodiments of the invention, FIG. 2 illustrates a flight display 30 comprising an exocentric 3-D flight display 32, a flight plan text window 34, and a side-view terrain image 36. The 3-D flight display shows the current flight path 38 and a 3-D representation of the nearby terrain.

Although none are shown in FIG. 2, nearby obstacles and other aircraft, if present, would also be illustrated. An ownship indicator 40 shows the current position of the aircraft relative to the flight path. Even in limited visibility situations in which a pilot would have difficulty seeing the actual terrain, this display enables the pilot to easily see the relationship of the flight path to the terrain. A virtual shadow 41 is created on the terrain directly below the ownship symbol to aid the terrain height awareness. The shadow is created as if the sun were directly over the ownship symbol. The path also casts a virtual shadow. In this case, the pilot could see that the current flight path would cause the aircraft to fly into the terrain (i.e., a CFIT situation) near waypoint "BEVEY," and thus can easily adjust the flight path to prevent this. The pilot may also pan the display, such as by using buttons 44, to change the perspective and to view other portions of the flight display. The pilot may also zoom the display out using the ZO ("zoom out") button 45, or zoom the display using a Z1 ("zoom in") button (not illustrated—the zoom in button will typically only appear when the display is zoomed out, and vice versa).

As shown, the 3-D flight display also comprises a plurality of vertical minimum height indicator lines 42. These lines provide a graphical representation of the relationship between the flight path and the required minimum height above ground that the aircraft must maintain. These vertical minimum height indicator lines aid in terrain awareness with relation to the path, and help the pilot quickly determine where the path comes close to the terrain. In FIG. 2, the minimum height is indicated by the dotted portion of line 42, and the extent that the flight path is above the minimum height is indicated by the solid portion of line 42. Thus, each line that shows any solid portion clearly indicates that the corresponding portion of the flight path puts the aircraft above the minimum height. Conversely, any line that shows only a dotted portion indicates that the corresponding portion of the flight path puts the aircraft below the minimum height, and adjustment is necessary. While dotted and solid line portions are used in FIG. 2, other representations may be used. For example, the minimum height may be indicated by a red portion of line 42, and the extent that the flight path is above the minimum height may be indicated by a green portion of line 42. An additional indicator, such as translucent hemisphere 47, may be used to indicate that the line drawn from the path to the ground intersects at a point less than a predefined height above ground (e.g., 500 feet).

The flight display 30 comprises a flight plan text window 34 which shows a textual description of the flight plan from the FMS. Based on the current aircraft position, the processing element may be configured to determine which segments of the flight plan have been executed, which segment is currently being executed, and which segments have yet to be executed. The processing element may render the flight plan text window to display the current segment instructions and the immediate next segment instructions. The illustrated scroll bar enables the pilot to scroll up to see previously executed segment instructions and to scroll down to see the unexecuted segment instructions. Different colors or other methods may be used to indicate which instruction(s) of the flight plan have already been executed, which is currently being executed, and which have yet to be executed.

The flight display 30 comprises a side-view terrain image 316. The side-view terrain image 36 shows the altitude component of the current flight path 50 (in this view) and terrain height 52 at corresponding points along the current flight path. An ownship indicator 54 shows the current position of the aircraft along the flight path. An altimeter display 56 shows the current altitude of the aircraft. As in the 3-D display 32, the side-view uses vertical minimum height indicator lines to provide a graphical representation of the relationship between the flight path and the required minimum height above ground that the aircraft must maintain. In the side-view terrain image 36, the minimum height is indicated by the dotted portion of the line, and the extent that the flight path is above the minimum height is indicated by the solid portion of the line. Thus, each line that shows any solid portion clearly indicates that the corresponding portion of the flight path puts the aircraft above the minimum height. Conversely, any line that shows only a dotted portion indicates that the corresponding portion of the flight path puts the aircraft below the minimum height, and adjustment is necessary. As above, other techniques (e.g., colors) may be used to indicate the different portions. The side-view terrain view enables the pilot to readily see the expected height of the aircraft above the terrain at all points along the current or planned flight path.

Using controls such as buttons 46, the pilot may switch between real-time and preview views of the flight path. The status of the selected view may be indicated using, for example, a dashed outline as shown in FIG. 2 or any other suitable indicator.

Although not illustrated in FIG. 2, the processing element may render a top-down, 2-D display view comprising the flight path and top-down terrain maps. The pilot may select either the 3-D view of FIG. 2 or the 2-D view.

Referring now to FIG. 3, a display mode of a system for displaying flight mission progress of an aircraft is illustrated, in accordance with embodiments of the invention. FIG. 3 illustrates a flight display 30 comprising an exocentric 3-D flight display 32, a flight plan text window 34 with a new ATC clearance text 35 received, and a side-view terrain image 36. FIG. 3 is very similar to FIG. 2, except that FIG. 3 displays the planned flight path that corresponds to the ATC clearance which the pilot has not yet accepted. While the current flight path was illustrated as a solid line in FIG. 2, the planned flight path 60 is illustrated as a dashed line in FIG. 3. An ownship indicator 40 shows the position of the aircraft relative to the planned flight flight path. This display enables the pilot to easily see the relationship of the planned flight path to the terrain. In this case, the pilot could see that the planned flight path would cause the aircraft to fly into the terrain (i.e., a CFIT situation) near waypoint "BEVEY," and thus can reject this flight path to prevent this. As in FIG. 2, this display also comprises a plurality of vertical minimum height indicator lines 42, providing a graphical representation of the relationship between the flight path and the required minimum height above ground that the aircraft must maintain. The flight display 30 comprises a flight plan text window 34 which shows a textual description of the ATC clearance 35. (The ATC clearance text 35 may be rendered in a different color until the pilot accepts the new path.)

Similar to FIG. 2, the flight display 30 of FIG. 3 comprises a side-view terrain image 36. The side-view terrain image 36 shows the altitude component of the planned flight path 50 (in this view) and terrain height 52 at corresponding points along the planned flight path. An ownship indicator 54 shows the position of the aircraft along the planned flight path. The side-view terrain image of FIG. 3 provides buttons 66 to enable the pilot to readily reject or accept the ATC clearance instructions (although these buttons may be provided in any position on the flight display, and do not necessarily need to be displayed within the side-view terrain image 36.

Inputs such as buttons 62 enable the pilot to advance the preview of the planned flight path, causing the invention to advance the ownship aircraft symbol along the depicted flight path. The pilot may select the speed at which the display is advanced (e.g., based on a multiplier of anticipated actual aircraft speed, such as eight times normal speed). The pilot may select to rewind the display, pause the display, or advance the display one step at a time.

Although FIG. 2 shows only the current flight path and FIG. 3 shows only the planned flight path, the display of embodiments of the invention could show both flight paths simultaneously. It is particularly important to distinguish between the current and planned flight paths when both are displayed at the same time, such as by using different colors and/or solid dashed lines. Both paths may be shown so the pilot has an idea of where the new path is with relation to the new one, before acceptance. Such a figure would typically show both the current and the planned flight paths until the pilot accepts or rejects the planned flight path. If the pilot accepts the planned flight path, the planned flight path becomes the current flight path. As such, the original "current" flight path would be removed from the display and the display of the original "planned" flight path would change (e.g., from dashed to solid line) to indicate that it is now the current flight path.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for displaying flight mission progress of an aircraft, the system comprising:
   a processing element configured to render an exocentric flight display of the aircraft, the flight display comprising at least an external scene topography, a current flight path, a planned flight path, one or more obstacles within a predefined distance of either the current or planned flight path, and one or more navigational symbologies, wherein the processing element is further configured to render the current location, a past location, or a future location of the aircraft on the flight display;
   a display element to assist in operation of the aircraft, wherein the display is configured to receive and display the flight display; and
   a control to select one or more of the current location, a past location, or a future location and to configure the flight display.

2. The system of claim 1, wherein the processing element is further configured to render a side-view terrain image showing either a current flight path or a planned flight path and terrain height at corresponding points along the respective current or planned flight path.

3. The system of claim 1, wherein the processing element is further configured to receive current location and attitude information of the aircraft and to render the current location and attitude on the flight display.

4. The system of claim 3, wherein the external scene topography corresponds to the current aircraft location.

5. The system of claim 3, wherein the processing element is further configured to determine whether the current aircraft location is greater than a predefined distance from the current flight path.

6. The system of claim 3, wherein the processing element further configured to render an ownship indicator showing the current location of the aircraft relative to the current flight path on the flight display.

7. The system of claim 6, wherein the processing element is further configured to render a virtual shadow on the external scene topography below the ownship indicator on the flight display.

8. The system of claim 1, wherein the processing element is further configured to receive current location information of other aircraft within a predefined distance the aircraft and to render the other aircraft within the flight display.

9. The system of claim 1, wherein the processing element is further configured to receive air traffic control (ATC) clearance information and wherein the planned flight path corresponds to the ATC clearance information.

10. The system of claim 1, wherein the processing element is further configured to determine if the planned flight path is predicted to cause the aircraft to approach within (a) a first predefined distance from terrain or (2) a second predefined distance from an obstacle.

11. The system of claim 10, wherein the processing element is further configured to render an alternate flight path selected to avoid causing the aircraft to approach within (a) the first predefined distance from terrain or (2) the second predefined distance from an obstacle.

12. The system of claim 1, wherein the external scene topography corresponds to a future location along either the current or planned flight path.

13. The system of claim 12, wherein the processing element is further configured to advance in time the rendered external scene topography along the selected current or planned flight path or both.

14. The system of claim 13, wherein the processing clement is further configured to advance in time the rendered external scene topography at a selected speed.

15. The system of claim 1, wherein the processing element is further configured to render airspace restrictions on the flight display.

16. A method for displaying flight mission progress, the method comprising the steps of:
   rendering, by a processing element, an exocentric flight display of the aircraft, the flight display comprising at least an external scene topography, a current flight path, a planned flight path, one or more obstacles within a predefined distance of either the current or planned flight path, and one or more navigational symbologies;
   receiving, in a display element to assist in operation of the aircraft, the flight display;
   displaying, in the display element, the flight display; and
   receiving a configuration of the flight display,
   rendering, by the processing element, the current location, a past location, or a future location of the aircraft on the flight display;
   wherein the step of receiving a configuration comprises receiving a selection of one or more of the current aircraft location, a past location, or a future location.

17. The method of claim 16, further comprising the step of:
   rendering, by the processing element, a side-view terrain image showing either a current flight path or a planned flight path and terrain height at corresponding points along the respective current or planned flight path.

18. The method of claim 16, further comprising the steps of:
   receiving, in the processing element, current location information of the aircraft; and rendering, by the processing element, the current location on the flight display.

19. The method of claim 18, wherein the external scene topography corresponds to the current aircraft location.

20. The method of claim 18, wherein the flight display further comprises an ownship indicator showing the current location of the aircraft relative to the current flight path.

21. The method of claim 20, wherein the flight display further comprises a virtual shadow on the external scene topography below the ownship indicator.

22. The method of claim 16, further comprising the steps of:
receiving, in the processing element, current location information of other aircraft within a predefined distance the aircraft; and
rendering, by the processing element, the other aircraft within the flight display.

23. The method of claim 16, further comprising the step of:
receiving, in the processing element, air traffic control (ATC) clearance information;
wherein the planned flight path corresponds to the ATC clearance information.

24. The method of claim 16, further comprising the step of:
determining, by the processing element, the planned flight path is predicted to cause the aircraft to approach within (a) a first predefined distance from terrain or (2) a second predefined distance from an obstacle.

25. The method of claim 24, further comprising the step of:
rendering, by the processing element, an alternate flight path selected to avoid causing cause the aircraft to approach within (a) the first predefined distance from terrain or (2) the second predefined distance from an obstacle.

26. The method of claim 16, wherein the external scene topography corresponds to a future location along either the current or planned flight path, and wherein the step of receiving a configuration comprises receiving a selection of a future location along either the current flight path or planned flight path or both.

27. The method of claim 26, further comprising the step of:
advancing in time, by the processing element, the rendered external scene topography along either the current or planned flight path.

28. The method of claim 27, wherein the rendered external scene topography is advanced in time at a selected speed, and wherein the step of receiving a configuration comprises receiving a selection of a speed.

29. The method of claim 16, wherein the step of receiving a configuration comprises receiving a selection of either the current flight path or planned flight path or both.

30. The method of claim 16, wherein the flight display further comprises airspace restrictions.

* * * * *